(12) United States Patent
Amtmann

(10) Patent No.: US 6,301,138 B1
(45) Date of Patent: Oct. 9, 2001

(54) DATA CARRIER WITH LOAD MODULATION MEANS AND WITH IMPROVED POWER SUPPLY IN THE PROCESS OF LOAD MODULATION

(75) Inventor: Franz Amtmann, Graz (AT)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/688,641

(22) Filed: Oct. 16, 2000

(30) Foreign Application Priority Data

Oct. 22, 1999 (EP) .................................................. 99890334

(51) Int. Cl.[7] ............................. H02M 7/06; G06K 19/06
(52) U.S. Cl. ............................................. 363/126; 235/492
(58) Field of Search ..................................... 363/125, 126, 363/127; 235/380, 492; 340/825.54

(56) References Cited

U.S. PATENT DOCUMENTS

| 4,737,761 | * | 4/1988 | Dosjoub et al. ...................... 340/58 |
| 5,345,231 |   | 9/1994 | Koo et al. . |
| 5,519,729 | * | 5/1996 | Jurisch et al. ....................... 375/259 |
| 5,521,590 | * | 5/1996 | Hanaoka et al. ................. 340/825.54 |
| 5,767,660 | * | 6/1998 | Schmidt .................................. 32/140 |
| 5,874,725 |   | 2/1999 | Yamaguchi ............................ 235/492 |
| 6,145,749 | * | 11/2000 | Thuringer et al. ................... 235/492 |
| 6,199,763 | * | 3/2001 | Thuringer et al. ................... 235/492 |

FOREIGN PATENT DOCUMENTS

| 0899682A2 | 3/1999 | (EP) ............................ G06K/19/077 |
| WO9705504 | 2/1997 | (WO) ............................ G01S/13/02 |

* cited by examiner

Primary Examiner—Adolf Deneke Berhane
(74) Attorney, Agent, or Firm—Daniel J. Piotrowski

(57) ABSTRACT

In a data carrier (1) having a transmission coil (2) and having an integrated circuit (3) connected to the transmission coil (2) the integrated circuit includes rectifier means (9), energy storage means (10), data processing means (13) and load modulation means (14), and additional means (18) are connected to the load modulation means (14) and to the energy storage means (10), the additional means (18), when the load modulation means (14) are in their active condition, enabling a part of the energy stored in the transmission coil (2) to be applied to the energy storage means (10), which are connected to the additional means (18), the energy storage means (10) connected to the additional means (18) being utilized for powering the data processing means (13).

8 Claims, 2 Drawing Sheets

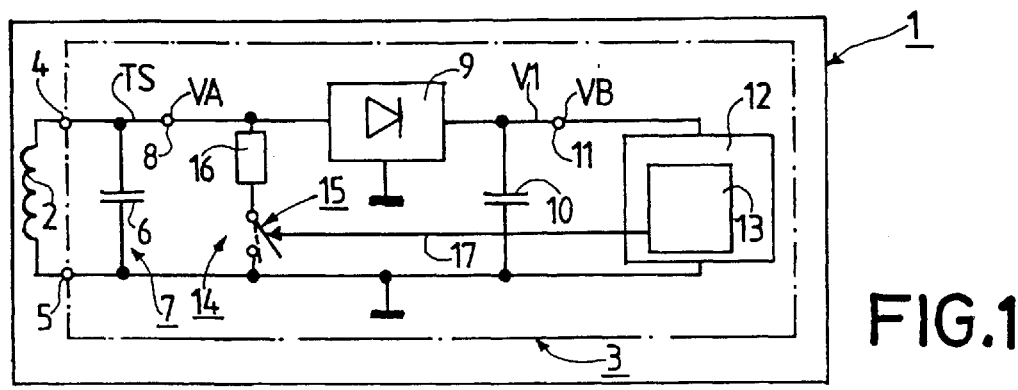
FIG.1
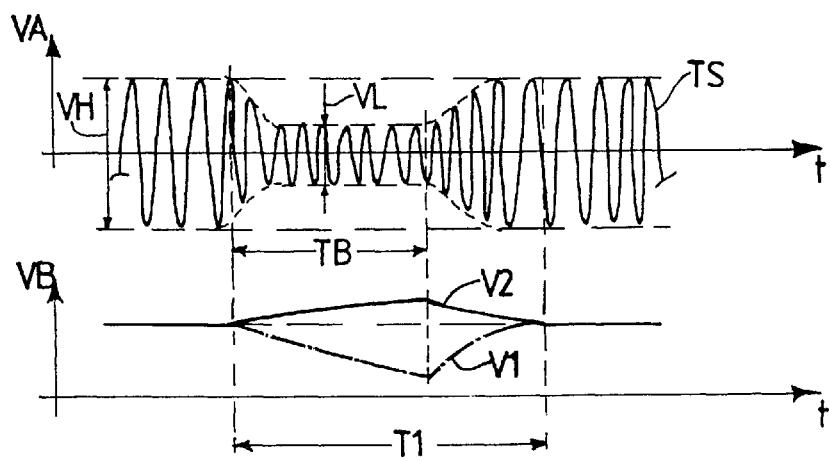
FIG.2A
FIG.2B
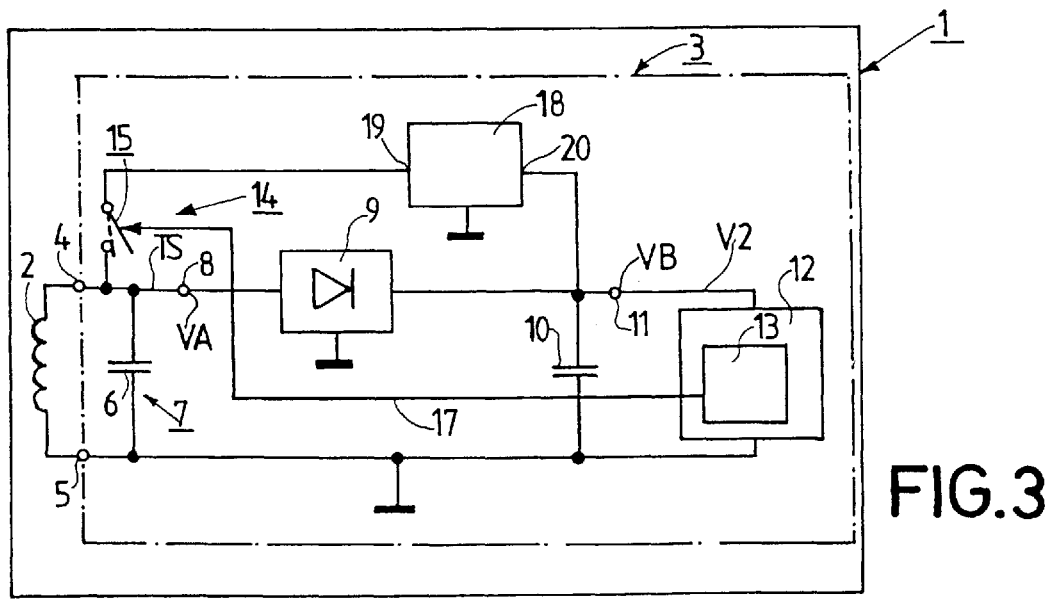
FIG.3

DATA CARRIER WITH LOAD MODULATION MEANS AND WITH IMPROVED POWER SUPPLY IN THE PROCESS OF LOAD MODULATION

BACKGROUND OF THE INVENTION

The invention relates to a data carrier as defined in the opening part of claim 1.

The invention further relates to an integrated circuit as defined in the opening part of claim 5.

Such a data carrier and such an integrated circuit have been put on the market by the applicant and are consequently known. In this respect reference may also be made to the patent document U.S. Pat. No. 5,345,231 A. In the known arrangements the effect occurs that the d.c. supply voltage collapses in the process of load modulation in certain time intervals corresponding to the activate state of the load modulation means, as a result of which the power supply in the data carrier and in its integrated circuit is impaired, which leads to a limited range of the data carrier during communication with a communication station provided for this purpose.

SUMMARY OF THE INVENTION

It is an object of the invention to preclude the aforementioned problems and to provide an improved data carrier of the type defined in the opening part of claim 1 and an improved integrated circuit of the type defined in the opening part of claim 5.

According to the invention, in order to achieve the aforementioned object, a data carrier as defined in the opening part of claim 1 is characterized in that it has the characteristic features defined in the characterizing part of claim 1.

According to the invention, in order to achieve the aforementioned object, an integrated circuit as defined in the opening part of claim 5 is characterized in that it has the characteristic features defined in the characterizing part of claim 5.

By providing the characteristic features in accordance with the invention it is achieved in a simple manner and by simple means that in the process of load modulation the additional means keep the d.c. supply voltage at least at the level in the modulation pauses, in those time intervals in which without the provision of the characteristic features in accordance with the invention a slump in the d.c. supply voltage would occur. This always guarantees an adequate d.c. supply voltage, as a result of which always a correct power supply is assured in the data carrier and in its integrated circuit and, consequently, always a maximal range is achieved.

In a data carrier in accordance with the invention and in an integrated circuit in accordance with the invention it has proved to be very advantageous when, in addition, the characteristic features as defined in claims 2, 3 and 6, 7, respectively, are provided. This results in a data carrier and an integrated circuit having reliable additional means which can be realized simply from the point of view of circuit engineering.

In a data carrier in accordance with the invention and in an integrated circuit in accordance with the invention it has proved to be very advantageous when, in addition, the characteristic features as defined in claims 4 and claim 8, respectively, are provided. This measure has proved to be advantageous in view of a particularly simple circuit design.

The above-mentioned as well as further aspects of the invention will become apparent from the embodiments described hereinafter by way of example and will be elucidated with reference to these examples.

BRIEF DESCRIPTION OF THE DRAWINGS

The invention will now be described in more detail with reference to the drawings, which show three embodiments given by way of example but to which the invention is not limited.

FIG. 1 is a block diagram which diagrammatically shows a prior-art data carrier, by means of which data carrier a load modulation of a carrier signal can be effected.

FIG. 2A shows a voltage waveform of a carrier signal in which a load modulation occurs in a time interval.

FIG. 2B shows the voltage waveform of a d.c. supply voltage which can be generated from the carrier signal that can be load-modulated.

FIG. 3, in the same way as FIG. 1, shows a data carrier in accordance with a first embodiment of the invention.

DESCRIPTION OF THE PREFERRED EMBODIMENTS

Figure 4:
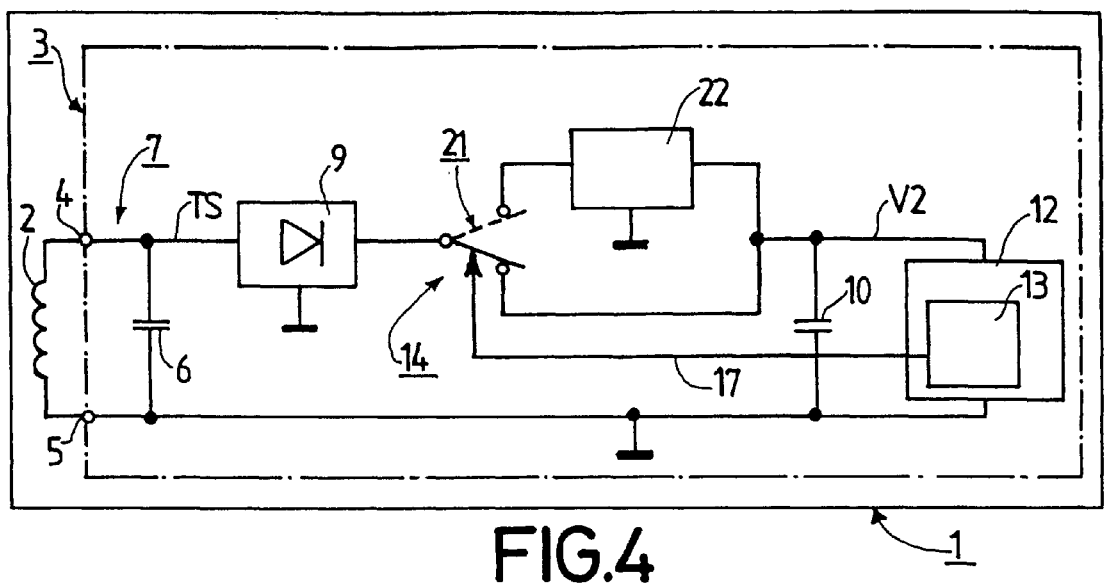
FIG. 4, in the same way as FIGS. 1 and 3, show a data carrier in accordance with a second embodiment of the invention.

FIG. 1 shows a known data carrier 1 intended and constructed for the contactless communication with a communication station.

The data carrier 1 includes a transmission coil 2. By means of the transmission coil 2 the data carrier 1 can communicate inductively, i. e. in a transformer-like fashion, with a transmission coil of a communication station. During such a communication between the communication station and the data carrier 1, when data is to be transmitted from the data carrier 1 to the communication station, the communication station generates an unmodulated carrier signal TS having a given operating frequency, which signal is transmitted to the transmission coil 2 of the data carrier 1 with the aid of the transmission coil of the communication station and is received by the transmission coil 2. The operating frequency of the carrier signal is for example 13.56 MHz. However, it may alternatively have a value of 125 kHz or any other value.

The data carrier 1 further includes an integrated circuit 3, indicated with the aid of a dash-dot line in FIG. 1. The integrated circuit 3 has a first terminal 4 and a second terminal 5. The two terminals 4 and 5 serve for the connection to the transmission coil 2 of the data carrier 1 and, consequently, for receiving the carrier signal TS.

The integrated circuit 3 has a capacitor 6 arranged between the two terminals 4 and 5. In this way, the capacitor 6 with the transmission coil 2 form a parallel resonant circuit 7. The parallel resonant circuit 7 is tuned to the operating frequency of the carrier signal TS. In the present case the capacitor 6 is realized within the integrated circuit 3. It is to be noted that alternatively a capacitor external to the integrated circuit 3 may be provided.

FIG. 1 shows a circuit point 8 in the connection to the parallel resonant circuit 7, on which point a voltage waveform VA of the carrier signal TS can be detected. Such a voltage waveform VA is shown in FIG. 2. As is apparent from FIG. 2A, the carrier signal TS exhibits an unmodulated peak-to-peak amplitude VH. In the case that a load modulation of the carrier signal TS occurs in a time interval TB the peak-to-peak amplitude VL of the carrier signal TS decreases.

The integrated circuit 3 and, consequently, the data carrier 1 include rectifier means 9, which are connected to the transmission coil 2 and, consequently, to the parallel resonant circuit 7 and with the aid of which a d.c. supply voltage V1 can be generated by rectification of the carrier signal TS. Furthermore, energy storage means 10 have been provided, which in the present case take the form of a capacitor 10 connected to the output of the rectifier means 9. The d.c. supply voltage V1 generated with the aid of the rectifier means 9 can be applied to the capacitor 10 for the purpose of energy storage.

In FIG. 1 a second circuit point 11 is shown, on which point a voltage waveform VB of the d.c. supply voltage V1 generated with the aid of the rectifier means 9 can be detected. In FIG. 2B the voltage waveform VB of the supply voltage V1 of the data carrier 1 shown in FIG. 1 is shown with a dash-dot line. As is apparent from FIG. 2B, the d.c. supply voltage V1 exhibits a substantially constant amplitude in the time intervals in which there is no load modulation of the carrier signal TS. However, when a load modulation appears in the carrier signal TS during the time interval TB, this causes the d.c. supply voltage V1 in the data carrier 1 of FIG. 1 to decrease during the time interval TB and subsequently to increase until a time interval T1 has expired, after which the d.c. supply voltage V1 again exhibits its constant value. As a result of the dip in the d.c. supply voltage V1, shown as a dash-dot line in FIG. 2B, the circuit parts of the integrated circuit 3 powered with this d.c. supply voltage V1 may no longer be powered correctly or satisfactorily, which results in at least a limitation of the range of the data carrier 1.

The integrated circuit 3 further includes a plurality of circuit sections which, for the sake of simplicity, are only shown as a single block 12 in FIG. 1. Of the further circuit sections represented by the block 12 only the data processing means 13 are shown separately in FIG. 1. With the aid of the data processing means 13 data stored in a memory of the integrated circuit 3 and, consequently, of the data carrier 1 can be read from the memory and can be processed in order to enable them to be transmitted from the data carrier 1 to a communication station. It is to be noted that the further circuit sections represented by the block 12 and, consequently, also the data processing means 13 can be supplied with the d.c. supply voltage V1 and can thus be powered with the aid of the energy storage means 10, i.e. with the aid of the capacitor 10.

To enable the afore-mentioned transmission of data from the data carrier 1 to a communication station the integrated circuit 3 and, consequently, the data carrier 1 includes load modulation means 14. In the present case the load modulation means 14 comprise an electronic switch 15 and a resistor 16 arranged in series with the electronic switch 15. In the present case, the series arrangement of the switch 15 and the resistor 16 is connected in parallel with the parallel resonant circuit 7 and, consequently, with the capacitor 6 and the transmission coil 2. The electronic switch 15 is formed by a transistor switch. The load modulation means 14 can be switched between a rest condition and an active condition. In the present case, the rest condition corresponds to the non-conductive state of the switch 15, which state is shown as a solid line in FIG. 1. In the present case, the active condition of the load modulation means 14 corresponds to the conductive state of the switch 15, which is shown as a dashed line in FIG. 1. The active condition of the load modulation means 14 may also be referred to as the operating condition. The rest condition of the load modulation means may also correspond to a state of comparatively poor conduction of an electronic switch and the active condition to a state.

The load modulation means 14, namely the electronic switch 15 of comparatively high conduction of the load modulation means 14, can be controlled by the data processing means 13 via a control line 17, this controlling of the load modulation means 14 being effected in dependence on the data processed by the data processing means 13, which data is to be transmitted to a communication station. The data to be transmitted may be encoded in accordance with a Manchester code (with or without subcarrier).

As already stated, the load modulation means 14 are connected to the transmission coil 2, as a result of which it is achieved that the carrier signal TS received by means of the transmission coil 2 can be load-modulated with the aid of the load modulation means 14, namely by switching the load modulation means 14 from their rest condition into their active condition. For the load modulation of the carrier signal TS reference is made once again to FIG. 2A. As regards the slump in the supply voltage V1, which occurs in the known data carrier 1 during load modulation of the carrier signal TS, reference is made once more to FIG. 2B.

FIG. 3 shows a data carrier in accordance with a first embodiment of the invention, which includes means with the aid of which the afore-mentioned problems which occur with the known data carrier 1 of FIG. 1 are precluded in a simple and effective manner.

In the data carrier 1 shown in FIG. 3 the load modulation means 14 also comprise an electronic switch 15 formed by a transistor switch.

Moreover, the load modulation means 14 in the data carrier 1 shown in FIG. 3 are advantageously connected to additional means 18, which in the present case are formed by a voltage doubler circuit. However, it is emphasized that instead of a voltage doubler circuit a voltage multiplier circuit may be provided which is capable of multiplying a voltage by a factor higher than the factor "two (2)". To connect the additional means 18 to the load modulation means 14 an input 19 of the additional means 18 is connected to the load modulation means 14, i.e. the electronic switch 15.

The additional means 18 further have an output 20. The additional means 18 are connected to the energy storage means 10 via this output 20. In the present case, the energy storage means 10 connected to the additional means 18 are formed by the energy storage means 10, i.e. the capacitor 10, connected to the rectifier means 9. However, it is emphasized that it is alternatively possible to connect a separate capacitor forming energy storage means to the output 20 of the additional means 18, which may be connected to the circuit point 11 and thus to the capacitor 10 via a diode junction.

In the data carrier 1 shown in FIG. 3 the advantage is obtained, with the aid of the load modulation means 14 and the additional means 18, that in the active condition of the load modulation means 14, i.e. in the conductive state of the electronic switch 15, a part of the energy stored in the transmission coil 2 can be applied to the energy storage means 10 connected to the additional means 18, i.e. to the capacitor 10, with the aid of the additional means 18, i.e. with the aid of the voltage doubler circuit, and that the energy storage means 10, which are connected to the additional means 18, are utilized for the power supply to the further circuit sections represented by the block 12 and, consequently, for the power supply to the data processing means 13.

As a result of the provision of the additional means 18, i.e. the provision of the voltage doubler circuit 18, in the data carrier 1 shown in FIG. 3 it is achieved in a very simple manner that in the process of a load modulation of the carrier signal TS—as is shown in FIG. 2A—additional energy is supplied to the energy storage means 10, i.e. the capacitor 10, with the aid of the additional means 18 during the time interval TB, as a result of which the voltage waveform V of the supply voltage V2, which can be detected on the second circuit point 9, has the shape shown as a solid line in FIG. 2B, so that in contradistinction to the supply voltage V1, in which a slump occurs during the occurrence of a load modulation, the supply voltage V2 even has an amplitude which lies above the constant value. Thus, in the data carrier 1 shown in FIG. 3 an adequate d.c. supply voltage V2 is also available in those time intervals in which the carrier signal TS is subject to a load modulation and, as a result, a correct power supply of the further circuit sections of the integrated circuit, which are represented by the block 12, and consequently of the data carrier 1, so that the data processing means 13 are also powered correctly with adequate energy during the occurrence of a load modulation of the carrier signal TS.

It is to be noted that the additional means 18 may alternatively be formed by a voltage raising circuit capable of raising a voltage by a factor greater than unity, for example 1.2 or 1.5.

It is to be noted that the voltage waveform VB of the supply voltage V2 which can be detected on the second circuit point 11 need not necessarily lie above the constant value but may also lie below it but should at any rate lie above the voltage waveform of the supply voltage V1.

FIG. 4 shows a data carrier 1 in accordance with a second embodiment of the invention. In the data carrier 1 shown in FIG. 4 the load modulation means 14 are not connected directly to the transmission coil 2 but indirectly via the rectifier means 9. The load modulation means 14 are now formed by an electronic change-over switch 21 whose switching state shown as a solid line corresponds to the rest condition of the load modulation means 14 and whose switching state shown as a dashed line corresponds to the active condition of the load modulation means 14.

The data carrier 1 shown in FIG. 4 also has additional means 22 connected to the load modulation means 14, the additional means in the present case being formed by a so-called charge pump 22. The additional means 22 formed by a charge pump 22 are likewise connected to energy storage means 10, namely to the capacitor 10. When the load modulation means 14 are in their active condition a part of the energy stored in the transmission coil 2 and applied to the charge pump 22 via the rectifier means 9 can be supplied to the energy storage means 10, i.e. the capacitor 10, which is connected to the charge pump 22. In the data carrier 1 of FIG. 4 this also precludes a slump in the supply voltage V2 when a load modulation occurs in the carrier signal TS.

Figure 5:
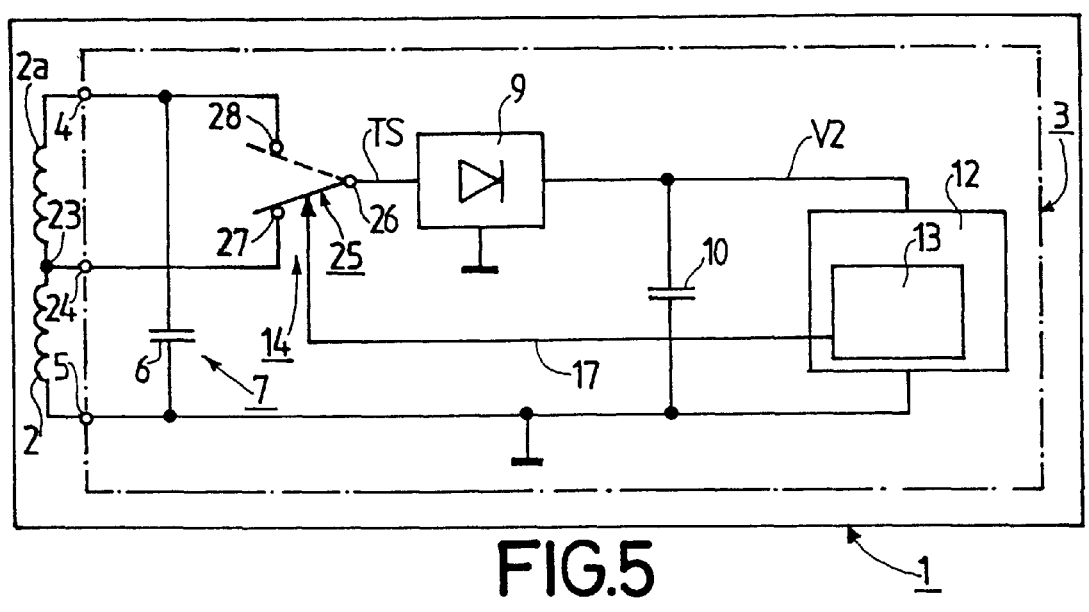
FIG. 5, in the same way as FIGS. 1, 3 and 5, show a data carrier in accordance with a third embodiment of the invention.

FIG. 5 shows a data carrier 1 in accordance with a third embodiment of the invention. In the data carrier 1 shown in FIG. 5 the transmission coil 2 has a tap 23 connected to a third terminal 24 of the integrated circuit 3.

In the data carrier 1 shown in FIG. 5 the load modulation means 14 are formed by an electronic change-over switch 25 having its fixed contact 26 connected to the rectifier means 9. A first input 27 of the electronic change-over switch 25 is connected to the third terminal 24 of the integrated circuit 3. A second input 28 of the electronic change-over switch 25 is connected to the first terminal 4 of the integrated circuit 3. In this way, it is achieved that the electronic change-over switch 25 is arranged in parallel with the part 2a of the transmission coil 2 situated between the first terminal 4 and the third terminal 24. The switching state of the change-over switch 25 shown as a solid line in FIG. 5 corresponds to the rest condition of the load modulation means 14. The switching state of the change-over switch 25 shown as a dashed line in FIG. 5 corresponds to the active condition of the load modulation means 14. In the embodiment of the data carrier 1 shown in FIG. 5 it is achieved that with the aid of the load modulation means 14, i.e. with the aid of the electronic change-over switch 25, the load of the parallel resonant circuit 7 can be changed. By the change-over of the change-over switch 24 the part of the transmission coil 2 disposed between the first terminal 4 and the third terminal 24 of the integrated circuit and forming the additional means 2a can be connected to the rectifier means 9 and, consequently, to the energy storage means 10, i.e. to the capacitor 10, as a result of which, when the load modulation means 14 are in the active condition, the additional means 2a enable a part of the energy stored in the transmission coil 2 to be supplied to the energy storage means 10, which are connected to the additional means 2a via the rectifier means 9, so that during load modulation of the carrier signal TS the energy storage means 10, which are connected to the additional means 2a, can supply adequate power to the further circuit sections which are symbolically represented by the block 12, including the data processing means 13, no slumps being produced in the d.c. supply voltage V2 in the process of load modulation.

It is to be noted that the phrase that certain means are connected to other means, i.e. electrically connected, does not imply that the means which are connected to one another should be connected directly to one another but may also be connected to one another indirectly, i.e. may be connected to one another via a means interposed between them.

What is claimed is:

1. A data carrier having a transmission coil for receiving a carrier signal and having rectifier means, which are connected to the transmission coil and which enable a d.c. supply voltage to be generated by rectification of the carrier signal, and having an energy storage means, which is connected to the rectifier means and to which the generated d.c. supply voltage can be applied for the purpose of storing energy, and having data processing means which can be powered with the d.c. supply voltage with the aid of the energy storage means connected to the rectifier means, and having load modulation means which can be switched between a rest condition and an active condition and which can be controlled from the data processing means and which are connected to the transmission coil and which enable the carrier signal received by the transmission coil to be load-modulated, namely by switching the load modulation means from their rest condition into their active condition, wherein additional means are connected to the load modulation means, and energy storage means are connected to the additional means, and the additional means, when the load modulation means are in their active condition, enable a part of the energy stored in the transmission coil to be supplied to the energy storage means, which are connected to the additional means, and the energy storage means, which are connected to the additional means, are utilized for powering the data processing means.

2. A data carrier as claimed in claim 1, wherein the additional means are formed by a voltage multiplier circuit.

3. A data carrier as claimed in claim 2, wherein the additional means are formed by a voltage doubler circuit.

4. A data carrier as claimed in claim 1, wherein the energy storage means, which are connected to the additional means, are formed by the energy storage means connected to the rectifier means.

5. An integrated circuit intended for a data carrier having a transmission coil for receiving a carrier signal and having a terminal intended for the connection to a transmission coil of a data carrier and for the reception of a carrier signal, and including rectifier means, which are connected to the terminal and which enable a d.c. supply voltage to be generated by rectification of the carrier signal, and having an energy storage means, which is connected to the rectifier means and to which the generated d.c. supply voltage can be applied for the purpose of storing energy, and having data processing means which can be powered with the d.c. supply voltage with the aid of the energy storage means connected to the rectifier means, and having load modulation means which can be switched between a rest condition and an active condition and which can be controlled from the data processing means and which are connected to the terminal and which enable the carrier signal received at the terminal to be load-modulated, namely by switching the load modulation means from their rest condition into their active condition, wherein additional means are connected to the load modulation means, and energy storage means are connected to the additional means, and the additional means, when the load modulation means are in their active condition, enable a part of the energy stored in the transmission coil to be supplied to the energy storage means, which are connected to the additional means, and the energy storage means, which are connected to the additional means, are utilized for powering the data processing means.

6. An integrated circuit as claimed in claim 5, wherein the additional means are formed by a voltage multiplier circuit.

7. An integrated circuit as claimed in claim 6, wherein the additional means are formed by a voltage doubler circuit.

8. A integrated circuit as claimed in claim 5, wherein the energy storage means, which are connected to the additional means, are formed by the energy storage means connected to the rectifier means.

* * * * *